United States Patent
Merryman et al.

[15] 3,677,077
[45] July 18, 1972

[54] VIBRATION MONITORING SYSTEM

[72] Inventors: George B. Merryman, 7998 Via Roma Drive, Fair Oaks, Calif. 95628; Joseph H. Merryman, P.O. Box 113, Meadow Vista, Calif. 95722

[22] Filed: Jan. 7, 1971

[21] Appl. No.: 104,578

[52] U.S. Cl. ................................................. 73/146, 73/71.2
[51] Int. Cl. ...................................................... G01m 17/00
[58] Field of Search .................. 73/516 R, 146, 71.2, 517 AV

[56] References Cited

UNITED STATES PATENTS

| | | | |
|---|---|---|---|
| 2,870,422 | 1/1959 | Gindes et al. | 73/517 R |
| 3,498,115 | 3/1970 | Liskey | 73/71.2 |
| 3,059,218 | 10/1962 | Baker | 73/516 X |
| 3,474,680 | 10/1969 | Babson et al. | 73/517 R |

*Primary Examiner*—Jerry W. Myracle
*Attorney*—Huebner & Worrel

[57] ABSTRACT

A vibration monitoring system particularly suited for use in isolating and measuring vibration of varying magnitudes simultaneously imparted to a plurality of mutually spaced locations defined on a moving vehicle. The system is characterized by a plurality of coiled electrical conductors, each being associated with a reciprocable soft iron core, about which exists a magnetic field, and coupled with a current measuring device through a manually operable selector switch, whereby current separately generated in the conductors, as the cores are reciprocated in response to imposed vibratory motion, is measurable for thus providing intelligence indicative of the magnitude of the vibration imposed at any one of the spaced locations.

3 Claims, 4 Drawing Figures

PATENTED JUL 18 1972 3,677,077

GEORGE B. MERRYMAN
JOSEPH H. MERRYMAN
INVENTORS

Huebner & Worrel
ATTORNEYS

VIBRATION MONITORING SYSTEM

BACKGROUND OF THE INVENTION

The invention relates to vibration monitoring systems and more particularly to a vibration monitoring system for use in detecting vibration imposed at various locations on a moving vehicle, whereby an analysis of the operation of the vehicle is facilitated in a practical, efficient and economic manner.

Heretofore, when road-testing an automobile for purposes of analyzing the source of experienced vibration difficulty in isolating the source often occurs. For example, where a wheel is improperly balanced, vibration emanating from the wheel during road-testing tends to be quite difficult to monitor due, in part, to the fact that the vibration often occurs only at road speeds, and therefore do not lend themselves to detection when the automobile is stationary. This problem is amplified in instances where the vehicle must be analyzed by mechanics operating with minimal instrumentation.

Consequently, there exists a need for a practical, economic, and efficient vibration monitoring system which is suited for simultaneously monitoring various locations defined on an automobile and providing intelligence indicative of the magnitude of vibration imposed on each of the monitored locations, during road-testing operations, so that malfunction can readily be diagnosed.

OBJECTS AND SUMMARY OF THE INVENTION

It is therefore an object of the instant invention to provide an improved, economic, and practical vibration monitoring system.

It is another object to provide an improved vibration monitoring system for use in measuring the magnitude of vibration imparted in selected portions of a moving vehicle.

It is another object to provide a vibration detection system for monitoring vibratory motion simultaneously imparted to multiplicity of mutual locations defined on a moving vehicle.

It is another object to provide a vibration detection system including a plurality of electrical generators, each being adapted to be mounted near a given wheel of a moving vehicle for detecting the presence of vibratory motion imparted to the wheel when the vehicle is operating at road speeds.

It is another object to provide an improved vibration detection system for monitoring vibratory motion simultaneously imparted to a multiplicity of locations defined on a vehicle undergoing road test operations for purposes of isolating the source of vibratory motion and determining the cause of such motion.

These and other objects and advantages are achieved through the use of a plurality of simplified electrical generators, each including a fixed coil and a moving magnetic field capable of generating an electrical current at an amperage commensurate with the magnitude of vibratory motion, and an associated monitoring circuit connected with the generators for measuring the amperage, whereby the electrical current derived from each of the plurality of generators readily can be sampled.

DESCRIPTION OF THE PREFERRED EMBODIMENT

Figure 1:
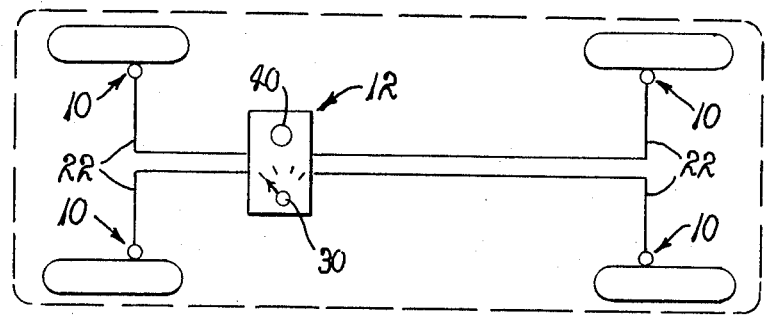
FIG. 1 is a schematic view illustrating in single-line form an operative environment for the vibration monitoring system which embodies the principles of the instant invention.

Referring now to the drawing wherein like reference characters designate like or corresponding parts throughout the several views, there is shown in FIG. 1 a vibration monitoring system which embodies the principles of the instant invention.

The vibration monitoring system, as shown in FIG. 1, includes a plurality of vibration detector units 10 electrically coupled with a read-out circuit 12, hereinafter more fully described. Each of the detector units 10 includes an hermetically sealed housing 14, FIG. 2, within which there is provided an electrical conductor 16. Preferably, the conductor 16 is of a helical configuration, including multiple turns, while the housing 14 is provided with a cylindrical bore, not designated, circumscribed by the conductor 16. The housing 14 preferably is fabricated from a nonferrous material. The particular manner in which the housing is fabricated is a matter of convenience. However, where found to be practical, the housing can be cast in place about the conductor. A mounting bracket 18 is provided to be employed in mounting the housing 14 at a selected location on a given automobile. The bracket 18, of course, can be of any suitable design so long as it functions as a mount for the housing 14.

The conductor 16 receives therein a concentrically related tubular sleeve 20, also formed of a nonferrous material, and is provided with electrical leads 22. These leads are connected in a suitable fashion with the ends of the conductor 16 and extend through the housing 14 to the read-out circuit 12 and couple the detector unit 10 therewith.

Figure 2:
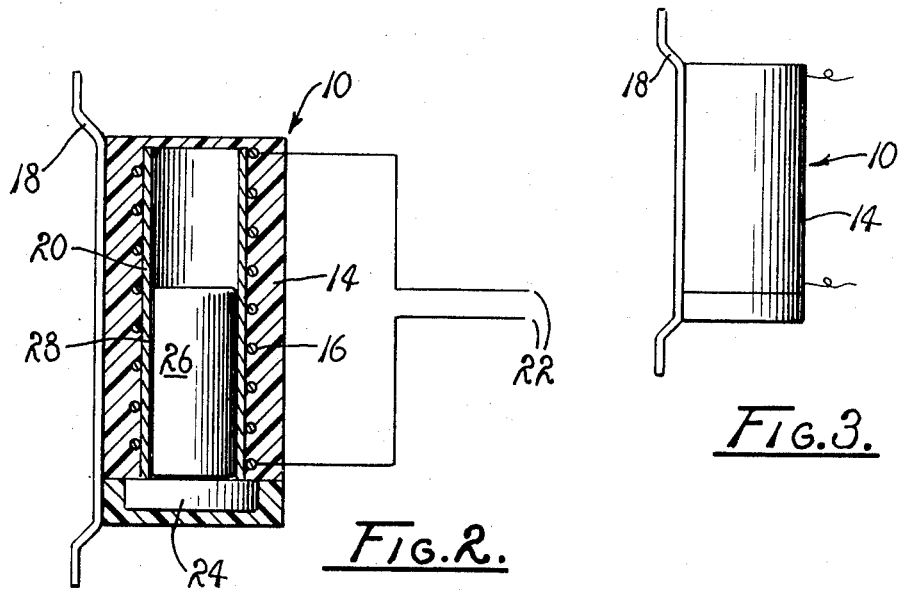
FIG. 2 is a partially sectioned, schematic view, illustrating a detector unit employed in the system shown in FIG. 1.
Figure 3:
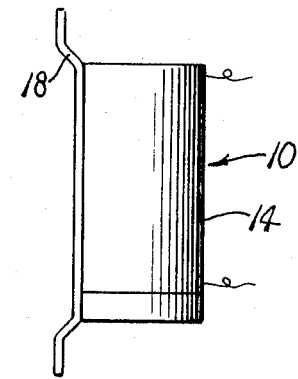
FIG. 3 is an external view of the detector unit shown in FIG. 2.
Figure 4:
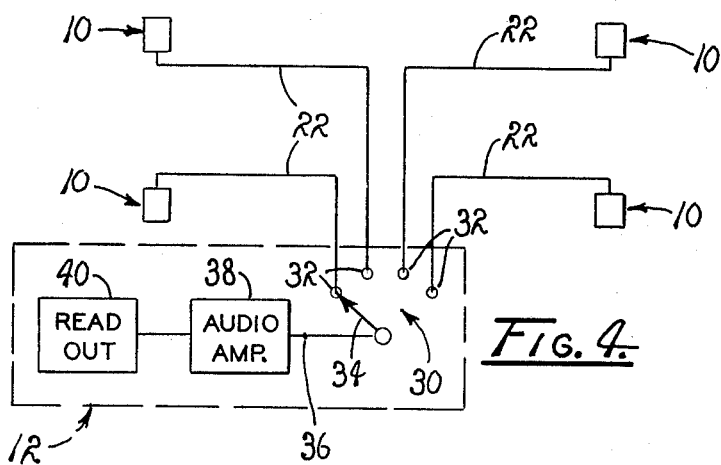
FIG. 4 is a diagrammatic view, in single-line, block diagram form, illustrating the vibration monitoring system shown in FIG. 1.

Within the lowermost end of the housing 14 there is mounted a permanent magnet 24, as illustrated in FIG. 2. The magnet 24 is so situated as to include lines of induction extending through the sleeve 20. As illustrated in FIG. 2, the permanent magnet 24 is magnet of a type commonly called a "bar magnet" and is supported in a contiguous relationship with one end of the sleeve 20. It will be appreciated, of course, that the magnet 24 also can be employed in a parallel relationship with the sleeve 20. Additionally, it is to be understood that magnets of other configurations, such as a type referred to as a "ring magnet," "horseshoe magnet," and the like, can be employed equally as well. It is, of course, important to understand that regardless of the configuration of the magnet 24, the lines of induction of its magnetic field must pass through the sleeve 20.

Slidably supported within the sleeve 20 there is a soft iron core 26 which functions to concentrate the lines of induction passing through the sleeve 20. The core 26 is of a cylindrical configuration and is provided with an outside diameter closely approximating the inside diameter of the sleeve 20. The length of the core 26 is substantially less than that of the sleeve 20 so that axial reciprocation of the core 26 within the sleeve 20 is accommodated as vibratory motion is imparted to the housing 14.

As the core 26 is moved in axial directions through the sleeve 20, the concentrated lines of induction are cut by the turns of the conductor 16. For reasons which are well understood, this cutting of the lines of induction induces an alternating electrical current, which flows through the connected leads 22. Of course, each of the detector units 10 is "-directional" in that it responds to force vectors substantially paralleling the longitudinal axis of the core 26, while being substantially insensitive to force vectors applied in transverse directions.

Since the outside diameter of the core 26 approximates the internal diameter of the sleeve 20, a friction-fit is established therebetween. In practice, however, a film of lubricant 28 is provided for the core 26. This lubricant also can be utilized as a damping fluid so that the detector unit 10 is rendered insensitive to vibrations of selected frequencies. The detector unit 10 thus can be rendered responsive to vibratory motion derived from a particular source, such as an unbalanced wheel, while being substantially insensitive to vibratory motion derived from a collateral source, such as the surface of the street or highway acting against the periphery of the wheel.

As hereinbefore mentioned, electrical current induced in the conductor 16, as a consequence of axial movement imparted to the core 26, is conducted through the leads 22 to the read-out circuit 12. This circuit is encased in a portable casing, not designated, adapted to be supported by a vehicle within the compartment of a vehicle. A coupling of the leads 22 with the read-out circuit 12 is achieved employing suitable "jacks," binding posts and the like, also not designated, associated with a selector switch 30. This switch, in effect, is a circuit isolation switch and includes a contact point 32 electrically coupled with each circuit established by a pair of the leads 22. The switch 30 further includes a selectively operable bridging element 34 supported to be manipulated for independently coupling each of the contact points 32 with a circuit input terminal 36 of an audio amplifier circuit 38.

The audio amplifier circuit 38 is of any suitable commercially available design. However, solid-state circuit capable of amplifying the input signal derived from the point 32 is particularly suited for use in the system embodying the instant invention.

The amplified output signal derived from the audio amplifier 38 is connected with an intelligence read-out device 40. As a practical matter, the read-out device 40 is any suitable circuit capable of indicating the magnitude of the current flowing through the leads 22. An ammeter functions quite satisfactorily for this purpose.

Since the circuitry of the audio amplifier 38 and the read-out device 40, of the read-out circuit 12, is commercially available and can be varied as found practical, a detailed description thereof is omitted in the interest of brevity. However, it is to be understood that the read-out circuit 12 is employed in providing intelligence indicative of the magnitude of electrical current established within the leads 22. Consequently, the device 40 can be so designed that the intelligence provided thereby can be aural as well as visual intelligence.

OPERATION

It is believed that in view of the foregoing description, the operation of the system will be readily understood and it will be briefly reviewed at this point.

With the system of the instant invention assembled in the manner hereinbefore described and coupled to selected locations, such as the wheel supports or other structure found near the wheels of an automobile, monitoring of vibration imparted to the locations can be conducted from within the compartment of the vehicle as the vehicle is subjected to road-test operations.

In order to employ the system for purposes of determining the balanced condition of the vehicle's wheels, the detector units 10 are affixed to the vehicle's axle, in the vicinity of the wheels. The leads 22 are extended therefrom into the compartment and connected with the read-out circuit 12. Of course, the detector units 10 can be mounted on the engine, fenders, and in any other location defined on the vehicle being subjected to road-test operations. In any event, once the detector units 10 are appropriately mounted on a given vehicle road-test operations are initiated. An operator can, simply by manipulating the bridging element 34 selectively and separately couple each of the detector units 10 with the read-out circuit 12 which provides a display of intelligence indicative of the magnitude of the electrical current generated by the selected detector unit and delivered to the audio amplifier 38 for thus providing an indication of the magnitude of the vibratory motion imposed thereon.

The current delivered to the audio amplifier 38 is derived as a consequence of movement imparted to the iron core 26 as vibratory motion is imposed on the housing 14 since such movement causes concentrated induction lines of the magnetic field of the magnet 24 to be severed by the turns of the conductor 16 so that a current flow is established in the leads 22. The lubricant 28 acts to dampen the movement of the iron core 26 so that the core responds to vibratory motion of a selected frequency, or range of frequencies, whereby the effect of collateral vibration substantially is ineffective for providing an intelligent signal at the read-out circuit 12. Furthermore, it should be apparent that since the magnet 24 is disposed in juxtaposition with the lowermost end of the sleeve 20, as viewed in FIG. 2, the combined effects of the mass of the core 26 and the magnetic field impede upward displacement of the core and thus further dampen its movement.

In view of the foregoing, it should readily be apparent that the vibration monitoring system of the instant invention is an economic, practical, and reliable system which has particular utility in detecting, isolating and measuring the magnitude of vibratory motion imparted to selected portions of a moving vehicle whereby analysis of malfunction is facilitated.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In a system for use in analyzing vibratory motion imparted to a plurality of mutually remote structural elements of a vehicle, including a transducer for converting electrical signals indicative of motion imparted to said elements to perceptual intelligence, the improvement comprising:
  A. a plurality of motion detector units, each detector unit including,
    1. means for coupling the detector in a substantially vertical orientation to one element of said plurality of elements,
    2. an hermetically sealed housing having seated therein a substantially vertically oriented sleeve formed of nonferrous material and having an internal cavity of a tubular configuration,
    3. an electrical conductor of a helical configuration disposed in a concentric, external relationship with said sleeve,
    4. a permanent magnet disposed in said housing in juxtaposition with the cavity for establishing therewithin a magnetic field, and
    5. a soft-iron core of a cylindrical configuration having a diameter substantially equal to that of the diameter of said cavity disposed within said field and supported for free-floating axial displacement relative to said conductor, whereby vertically directed components of vibratory motion imposed on said element impart linear displacement to said core for thus causing lines of induction of the magnetic field to be served and electrical signals to be generated within said conductor, said signals being indicative of the vibratory motion;
  B. electrical signal transmission means interposed between said electrical conductor and said transducer for transmitting electrical signals generated in said electrical conductor to said transducer; and
  C. means for isolating signals received from each of said detector units.

2. In the system of claim 1, the improvement wherein the permanent magnet is disposed in juxtaposition with the lowermost end of said cavity.

3. In the system of claim 2, the improvement further comprising a film of lubricant formed about said core.

* * * * *

UNITED STATES PATENT OFFICE
CERTIFICATE OF CORRECTION

Patent No. 3,677,077                Dated July 18, 1972

Inventor(s)   George B. Merryman and Joseph H. Merryman

It is certified that error appears in the above-identified patent and that said Letters Patent are hereby corrected as shown below:

Column 4, line 54, change "served" to ---severed---.

Signed and sealed this 24th day of October 1972.

(SEAL)
Attest:

EDWARD M. FLETCHER, JR.                ROBERT GOTTSCHALK
Attesting Officer                       Commissioner of Patents